D. I. BURTON.
SAFETY ROBE RACK.
APPLICATION FILED APR. 21, 1910.
992,940.
Patented May 23, 1911.
2 SHEETS—SHEET 1.
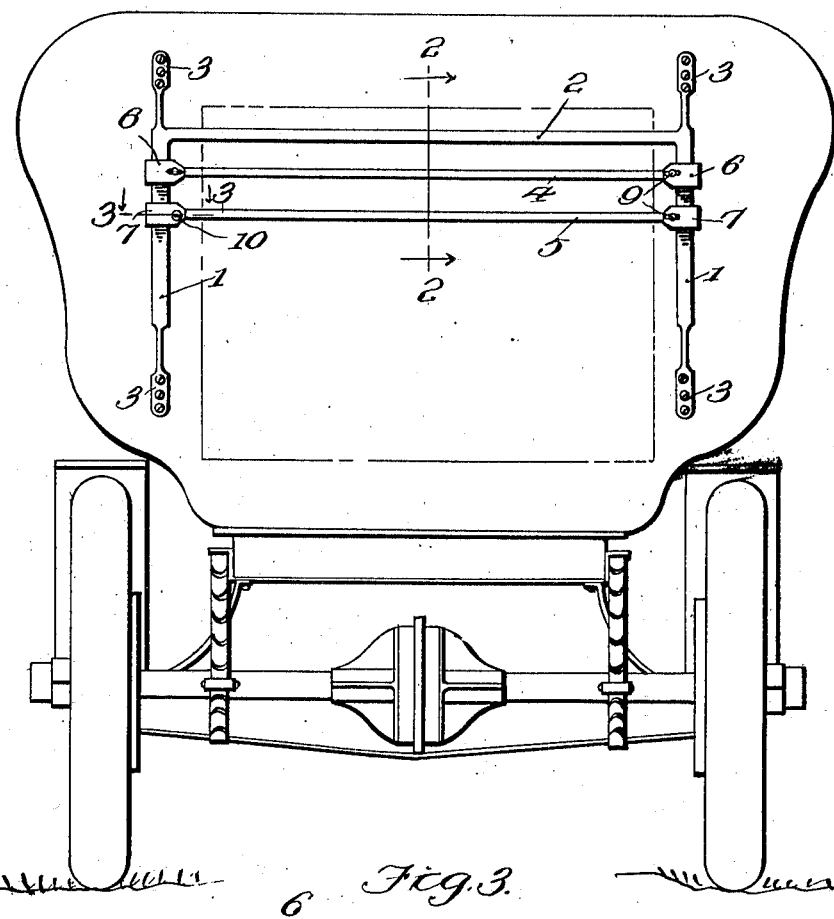
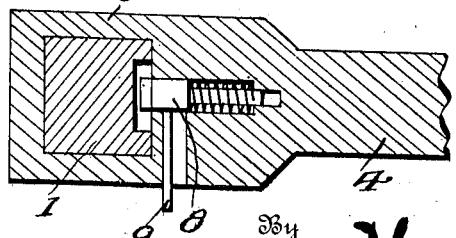
Witnesses
Inventor
D. I. Burton.

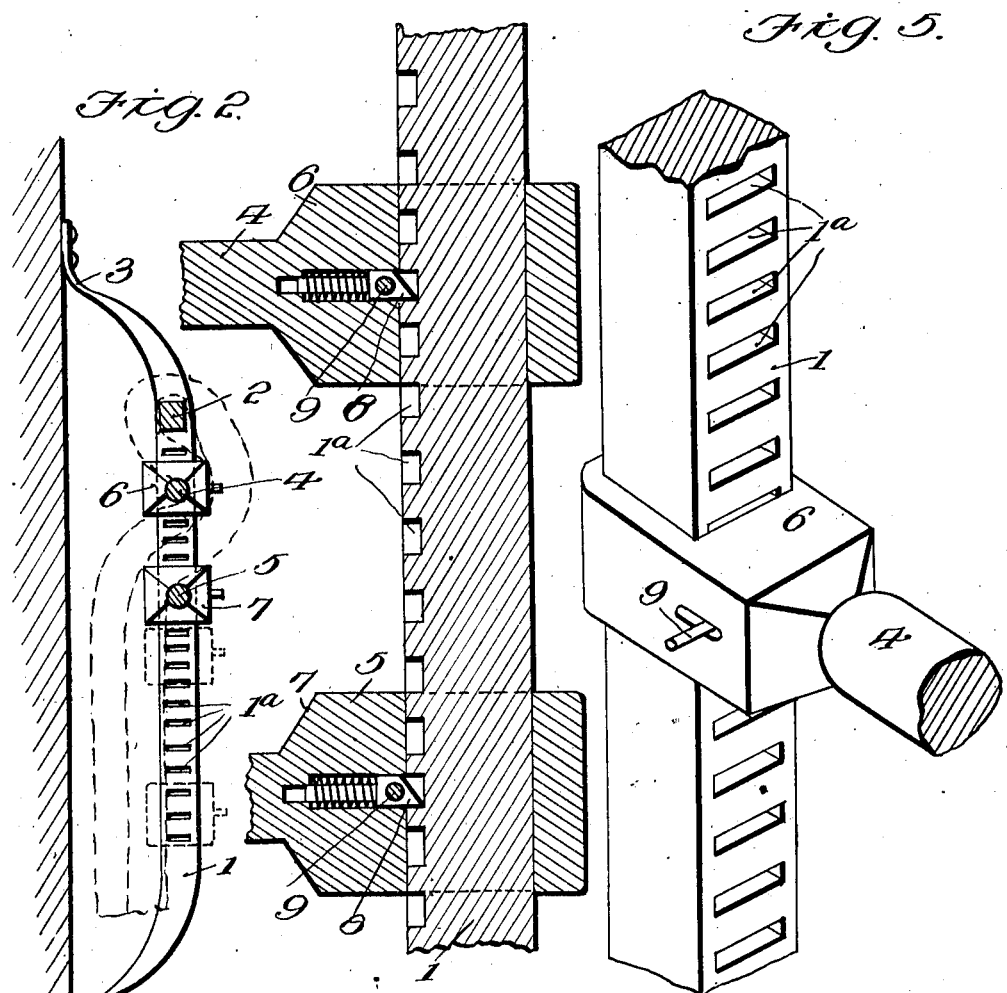
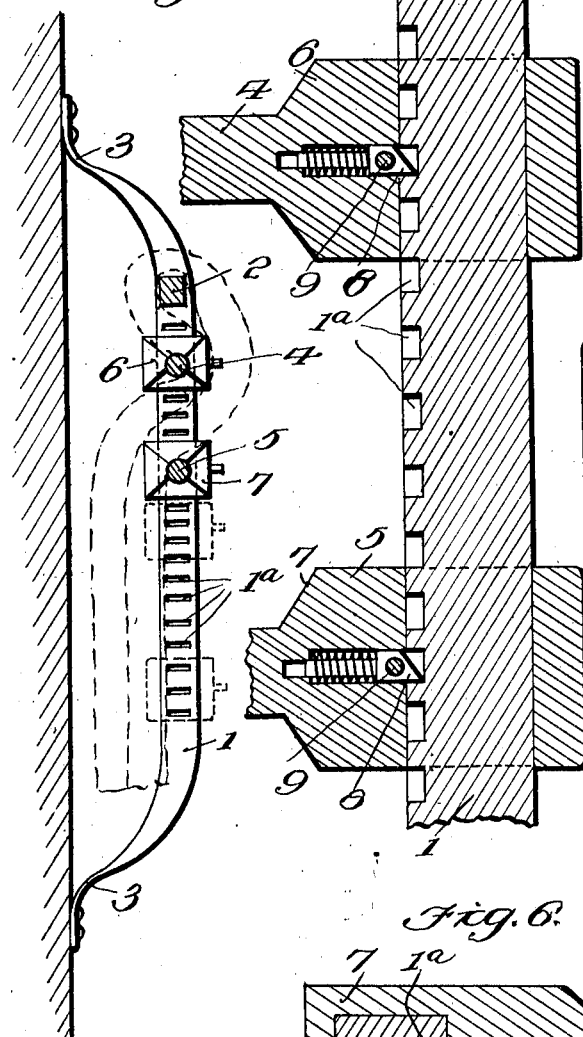
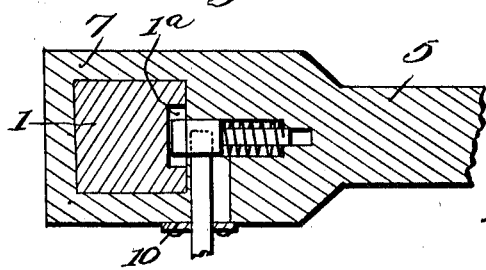

UNITED STATES PATENT OFFICE.

DONALD I. BURTON, OF ASBURY PARK, NEW JERSEY.

SAFETY ROBE-RACK.

992,940.  Specification of Letters Patent.  Patented May 23, 1911.

Application filed April 21, 1910. Serial No. 556,845.

*To all whom it may concern:*

Be it known that I, DONALD I. BURTON, citizen of the United States, residing at Asbury Park, in the county of Monmouth and State of New Jersey, have invented certain new and useful Improvements in Safety Robe-Racks, of which the following is a specification.

This invention comprehends certain new and useful improvements in racks for holding lap-robes or the like, designed particularly to be applied to the dash-board or the rear of the front seat of any vehicle, such as an automobile for instance, although the rack may be secured to any desired support for holding a lap-robe, or coats or the like.

The invention has for its primary object a simple, durable and efficient construction of rack of this character which will hold with safety the robe which is placed upon it and effectively prevent the surreptitious removal of the robe, which is a constant source of loss and annoyance to the owners of automobiles or other vehicles.

With this and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which:

Figure 1 is a rear elevation of my device showing one application thereof; Fig. 2 is a transverse sectional view on the line 2—2 of Fig. 1; Fig. 3 is an enlarged horizontal sectional view on the line 3—3 of Fig. 1; Fig. 4 is a fragmentary vertical section; Fig. 5 is a fragmentary perspective view; and, Fig. 6 is a detail sectional view of one of the latches.

Corresponding and like parts are referred to in the following description and indicated in all the views of the drawings by the same reference characters.

My improved safety rack comprises standards 1 that are vertically disposed when in position and are arranged in spaced relation to each other, being connected preferably permanently at their upper ends by a relatively stationary cross bar 2. The standards 1 are provided at their upper and lower ends with angularly disposed brackets 3, the extremities of which are formed with screw holes or the like so that the rack may be easily secured to the part intended to support it, with the standards 1 in spaced relation to the surface of such part.

In connection with the standard 1 and relatively stationary cross bar 2, I employ upper and lower movable cross bars, designated 4 and 5 respectively, the same extending parallel to each other and to the stationary cross bar 2. The cross bar 4 is connected at its ends to sleeves 6 which are mounted to slide vertically on the standards 1, being formed with openings which correspond in outline to the cross sectional shape of the standards. Preferably, the sleeves 6 are reduced at their inner or opposing ends, where they are connected in any desired way to the ends of the upper movable bar 4. The lower movable bar 5 is correspondingly connected at its ends to sleeves 7 that are mounted to slide vertically upon the standards 1, whereby a lap-robe or the like which is thrown over the upper or relatively stationary bar 2 may have its end portions clamped between the bar 2 and the bars 4 and 5 by moving the latter upwardly, or between only the bars 4 and 5, if desired.

In order to hold the movable bars after they have been adjusted to the desired extent, each of the sleeves 6 contains a spring latch 8 which is adapted to work in a vertically extending series of notches or keepers 1ª formed in the standards 1, said latches being spring-pressed, as above noted, into engagement with the notches and being arranged for retraction therefrom by handles 9 which extend through slots formed in the sleeves. One of the sleeves 7 is correspondingly provided with a spring pressed latch, but the other sleeve 7 is provided with a spring latch operable only by a key, the face plate being indicated at 10. It will thus be understood that the bars 4 and 5 may be adjusted up and down to the desired extent for the purpose of clamping the end portions of a lap-robe or clamping any other garment or covering, and that after the desired adjustment has been effected, the parts can only be moved away from each other to release the lap-robe or the like by first inserting a key through the face plate 10 so as to disengage the spring latch at one end of the lower movable bar 5.

It will be seen that I have provided a very simple and inexpensive device which will be durable in construction, the parts being simple in construction and capable of being easily manufactured and readily assembled and that the device will be effective in use and capable of being easily manipulated.

Having thus described the invention, what is claimed as new is:

1. A rack of the character described, comprising spaced standards formed at their ends with angularly disposed brackets by which they may be connected to a support, upper and lower movable bars extending in parallel relation to each other from one standard to the other, sleeves connected to one end of the respective bars and arranged to slide on the standards, and spring latches carried by the sleeves, the standards being formed with notches for engagement by said latches.

2. A rack of the character described, comprising standards provided at their ends with brackets by which they are arranged to be connected to a support, a relatively stationary bar extending from one standard to the other at one end of the standards, and permanently connecting the standards together, upper and lower movable bars extending parallel to each other and to the first-named bar, sleeves to which the ends of the movable bars are connected, the sleeves being mounted for a sliding movement on the standards, the standards being formed in their opposing edges with notches, and spring latches carried by the respective sleeves and arranged for engagement in said notches, all of said latches with the exception of one being provided with handles projecting freely out through the sleeves whereby the latches may be retracted, but the remaining latch being provided with a face plate formed with a key hole and such latch being operable only by a key.

In testimony whereof, I affix my signature in presence of two witnesses.

DONALD I. BURTON. [L. S.]

Witnesses:
 SAML. A. PATTERSON,
 EDITH V. GOODNOW.